United States Patent [19]

Chatagnier, Jr. et al.

[11] Patent Number: 5,425,428
[45] Date of Patent: Jun. 20, 1995

[54] SLIMHOLE CORING SYSTEM

[75] Inventors: John C. Chatagnier, Jr., Houston; Delbert L. Head, Kingwood, both of Tex.

[73] Assignee: Fugro-McClelland Marine Geosciences, Inc., Houston, Tex.

[21] Appl. No.: 95,962

[22] Filed: Jul. 22, 1993

[51] Int. Cl.⁶ ............................................. G21B 25/02
[52] U.S. Cl. ............................................. 175/58; 175/215; 175/320
[58] Field of Search ............... 175/58, 246, 320, 215; 166/242

[56] References Cited

U.S. PATENT DOCUMENTS

| | | | |
|---|---|---|---|
| 3,786,878 | 1/1974 | Chapman | 175/320 |
| 3,815,691 | 6/1974 | Richter, Jr. et al. | 175/320 |
| 3,926,265 | 12/1975 | Bouyoucos | 175/320 X |
| 4,278,138 | 7/1981 | Rowley et al. | 175/320 |
| 4,691,790 | 9/1987 | Reichman et al. | 175/320 X |
| 4,860,838 | 8/1989 | Asak | 175/320 |
| 5,125,463 | 6/1992 | Livingstone et al. | 175/320 X |

Primary Examiner—Ramon S. Britts
Assistant Examiner—Frank S. Tsay
Attorney, Agent, or Firm—Fish & Richardson

[57] ABSTRACT

An apparatus and method for transporting a tool through a drill string in slimhole drilling operations is disclosed. A fluid passage such as a groove is formed in the inner wall of the pipe joint to permit the passage of fluid from one pipe section to an adjacent pipe section as a tool is transported through the pipe joint. In one embodiment of the invention, the tool can comprise a core barrel for retrieving a core sample from the wellbore.

18 Claims, 2 Drawing Sheets

SLIMHOLE CORING SYSTEM

FIELD OF THE INVENTION

The present invention relates to an improved system for removing a core sample from a well. More particularly, the invention relates to a slimhole coring system that safely permits the removal of a core sample from a well through a drill pipe having a minimal interior diameter.

BACKGROUND OF THE INVENTION

The exploration for and production of hydrocarbons such as oil and gas requires the drilling of wellbores to locate and produce the hydrocarbons. Subsequently, the wellbores are completed so that the hydrocarbons can be produced to the surface. Historically, large diameter boreholes were drilled to access the reservoirs. Because the volume of the wellbore cylinder is equal to a dimension defined as pi multiplied by the cylinder length and by the cylinder radius squared, the diameter of a wellbore significantly affects the quantity of rock cuttings that must be removed. For example, a reduction in the wellbore diameter by one-half reduces the quantity of rock cuttings by three-quarters. Because the cost of a wellbore is directly proportional to the quantity of rock cuttings removed, there is a need to reduce the size of the wellbore and associated equipment necessary to drill and produce the wellbore.

Small diameter wellbores, created by "slimhole" drilling techniques, are being used in certain applications as a vehicle for reducing drilling and production costs. The smaller wellbores utilized downsized drilling rigs, less manpower, and fewer supplies and equipment. The reduction in equipment significantly reduces the costs associated with transporting the drilling rig into remote locations by helicopter. Slimhole wellbores are also used in production wells to establish multiple horizontal wells from an existing vertical well, and to extend the depth of existing vertical wells. Slimhole wellbores are used in exploration programs to reduce the cost of obtaining geological and geophysical data in remote and unexplored locations. For example, slimhole stratigraphic tests such as coring programs can supplement seismic data so that a geochemical, lithological, and petrophysical model of the basin and hydrocarbon bearing reservoirs can be developed.

Coring operations physically remove a core sample of the rock from the wellbore so that the core sample can be evaluated. The core data provides geological and geoscientific data regarding the potential of a geologic basin, including information regarding the content of source material and the requisite temperature necessary to form hydrocarbons from the source material. A coring drill bit is rotated to encapsulate a cylindrical core sample within a core barrel, and the core barrel is removed to the well surface with a wireline or pumping techniques known in the art. Continuous coring operations use a retrievable core barrel that can be pulled through the drill string with a wireline without removing the drill bit from the bottom of the wellbore.

The viability of a slimhole drilling program is significantly affected by well safety concerns. When a wellbore is drilled through a reservoir containing hydrocarbons under pressure, gas in the reservoir can enter the drilling column. As the pressure on the gas is released, the gas will expand and displace the drilling fluid in the drill string. These gas "kicks" are usually controlled by the weight of drilling fluid circulated through the wellbore during drilling operations. A slimhole drilling rig requires only fifty to three hundred barrels of mud, which is substantially less than a conventional drilling system. Because slimhole wells have a smaller diameter that substantially reduces the volume of drilling mud available in the well to control gas pressure, well control is a significant concern in slimhole drilling operations. Although slimhole drilling systems have been developed to closely monitor the wellbore during drilling operations, the circulation of drilling mud through the drill string is a critical factor in maintaining safe drilling operations.

The removal of a core barrel from the drill string can encumber the circulation of drilling mud necessary to maintain control of the well. As the core barrel is run into and out of the drill string during drilling operations, the core barrel displaces fluid and creates swabbing pressures within the drill string. Running out of the drill string too quickly can reduce the hydrostatic head and lead to an influx of hydrocarbon fluids. Running into the drill string too quickly can exceed the formation fracture gradient and cause lost circulation. These problems are particularly evident at the tool joint connecting two sections of drill pipe. The interior bore of the pipe ends at the tool joint is typically smaller than the bore of the pipe mid section. This smaller internal diameter limits the circulation of drilling fluid as the core sample passes through the tool joint, and interferes with the pressure of the fluid necessary for pressure control of the well. Accordingly, a need exists for an apparatus and method that can permit coring operations in slimhole drilling while pressure control of the well is maintained.

SUMMARY OF THE INVENTION

The present invention overcomes the disadvantages of the prior art by disclosing a system for running tools in slimhole drilling operations. The invention facilitates the passage of a tool, such as a core barrel, through the interior of a pipe. A first pipe section and a second pipe section have interior diameters of a selected dimension and are attached at the pipe section ends to create a pipe joint. The interior diameter of the pipe joint is less than the interior diameter of the first and second pipe sections. A fluid passage across the pipe joint permits the transport of fluid between the interiors of the first and second pipe sections when the tool is located within the pipe joint. In one embodiment of the invention, the fluid passage comprises a groove in the inner wall of the pipe joint.

The method of the invention is practiced by connecting a first pipe section to a second pipe section to create a pipe joint having an interior diameter less than the interior diameter of the first and second pipe sections. The first and second pipe sections are installed in a well, fluid is placed into the interior of the first and second pipe sections, and the tool is transported through the interior of the pipe joint. A groove in the inner wall of the pipe joint permits the transport of the fluid past the pipe joint as the tool moves through the pipe joint.

DESCRIPTION OF THE PREFERRED EMBODIMENTS

Figure 1:
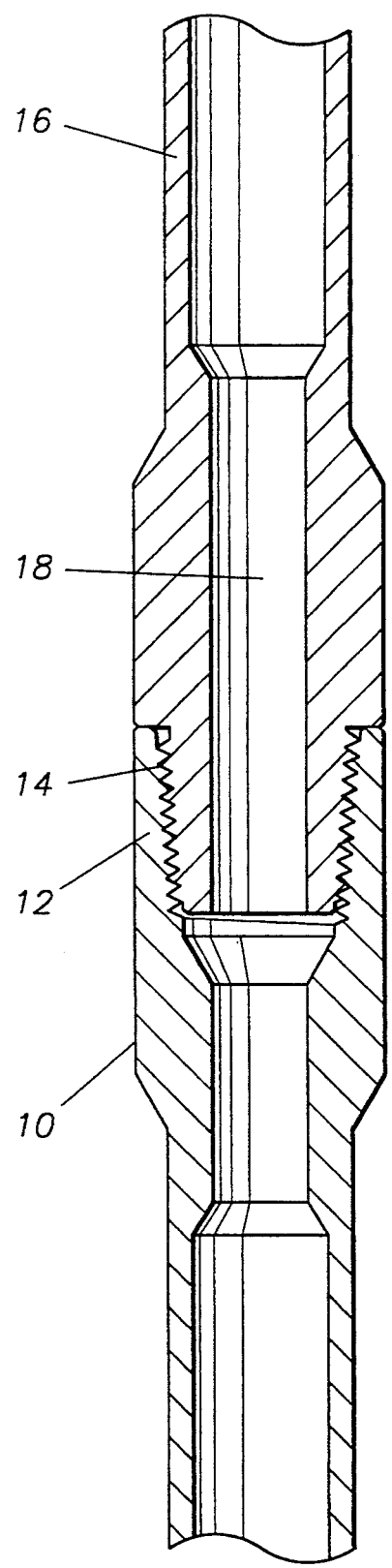
FIG. 1 illustrates a conventional tool joint in a drill string.

The present invention furnishes an apparatus and method for facilitating the transport of a tool through a drill string in slimhole drilling operations. Referring to FIG. 1, a conventional "tool" or pipe joint is illustrated. As illustrated, pipe joint 10 includes threaded box 12 for rotatable connection with threaded nipple 14 of pipe joint 16. Bore 18 has a diameter less than the internal diameters of pipe joint 10 or pipe joint 16. In normal drilling operations, multiple pipe joints are connected to form a drill string, and a drill bit or drill rod section (not shown) is connected to the lower end of the drill string for cutting the desired borehole. Drilling fluid is circulated down through the interior of the drill string, through the drill bit, and returns to the well surface through the annulus between the drill string and the wellbore.

Figure 2:
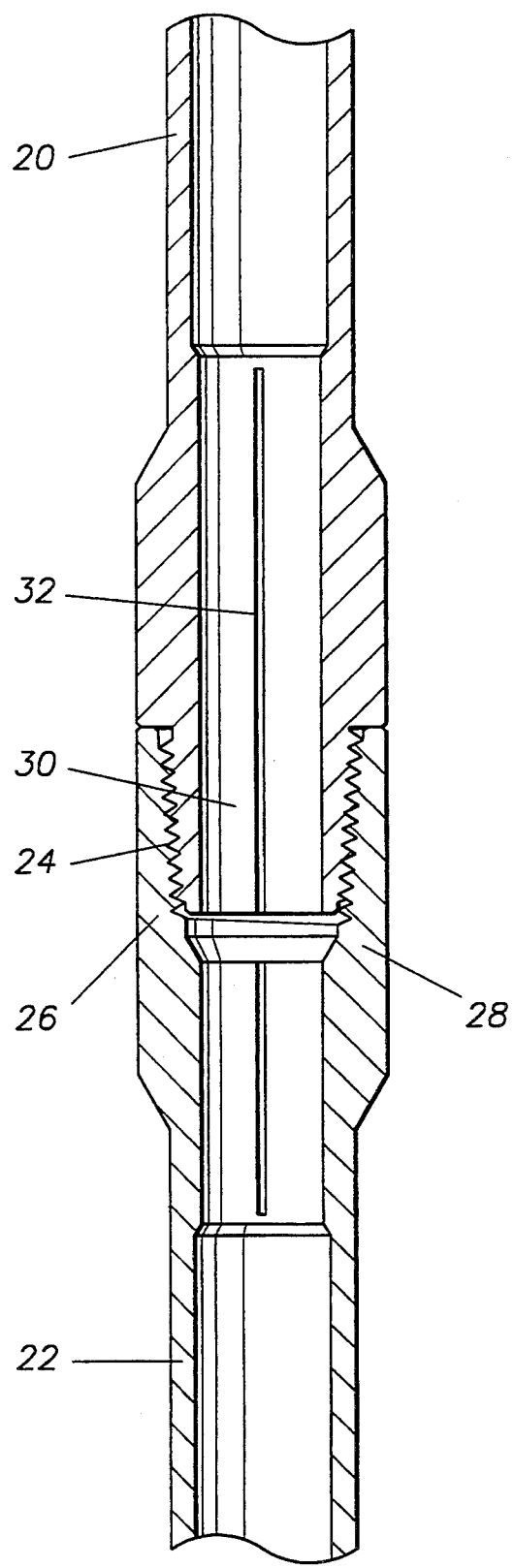
FIG. 2 illustrates a tool joint in a modified drill string having a larger diameter bore and a fluid passage across the tool joint.

FIG. 2 illustrates an embodiment of the present invention. First pipe section 20 defines an interior bore having a selected diameter. Second pipe section 22 similarly defines an interior bore for permitting the passage of tools and drilling fluid (not shown). Threaded nipple end 24 of first pipe section 20 is rotatibly connected with threaded box end 26 of second pipe section 22 to create pipe joint 28. As illustrated, pipe joint 28 includes bore 30 that has a diameter smaller than the interior diameters of first pipe section 20 and second pipe section 22. In one embodiment of the invention, bore 30 can be larger than bore 18 through a conventional pipe section as illustrated in FIG. 1. This embodiment would permit the passage of tools through pipe joint 28 that are larger than tools that could pass through bore 18 in FIG. 1. Bore 30 can be enlarged during the original manufacture of first pipe section 20 and second pipe section 22, or could be created by drilling through conventional pipe sections.

Referring to FIG. 2, fluid passage 32 traverses pipe joint 28 to furnish a fluid communication path between the interior of first pipe section 20 and the interior of second pipe section 22. As illustrated, fluid passage 32 can comprise a groove that is milled or cut into the inner wall of pipe joint 28. Alternatively, fluid passage 32 can comprise a port that is drilled or otherwise formed in pipe joint 28. Although FIG. 2 illustrates one fluid passage 32, a plurality of fluid passages 32 can be utilized to facilitate the flow of the fluid between the interior of first pipe section 20 and second pipe section 22.

Fluid passage 32 is adaptable to drill pipe, to drill rod, or to similar tubulars having a constriction such as a pipe joint. For example, the use of fluid passage 32 is equally applicable in pipeline operations requiring the transport of a pig or other tool through the pipeline.

Figure 3:
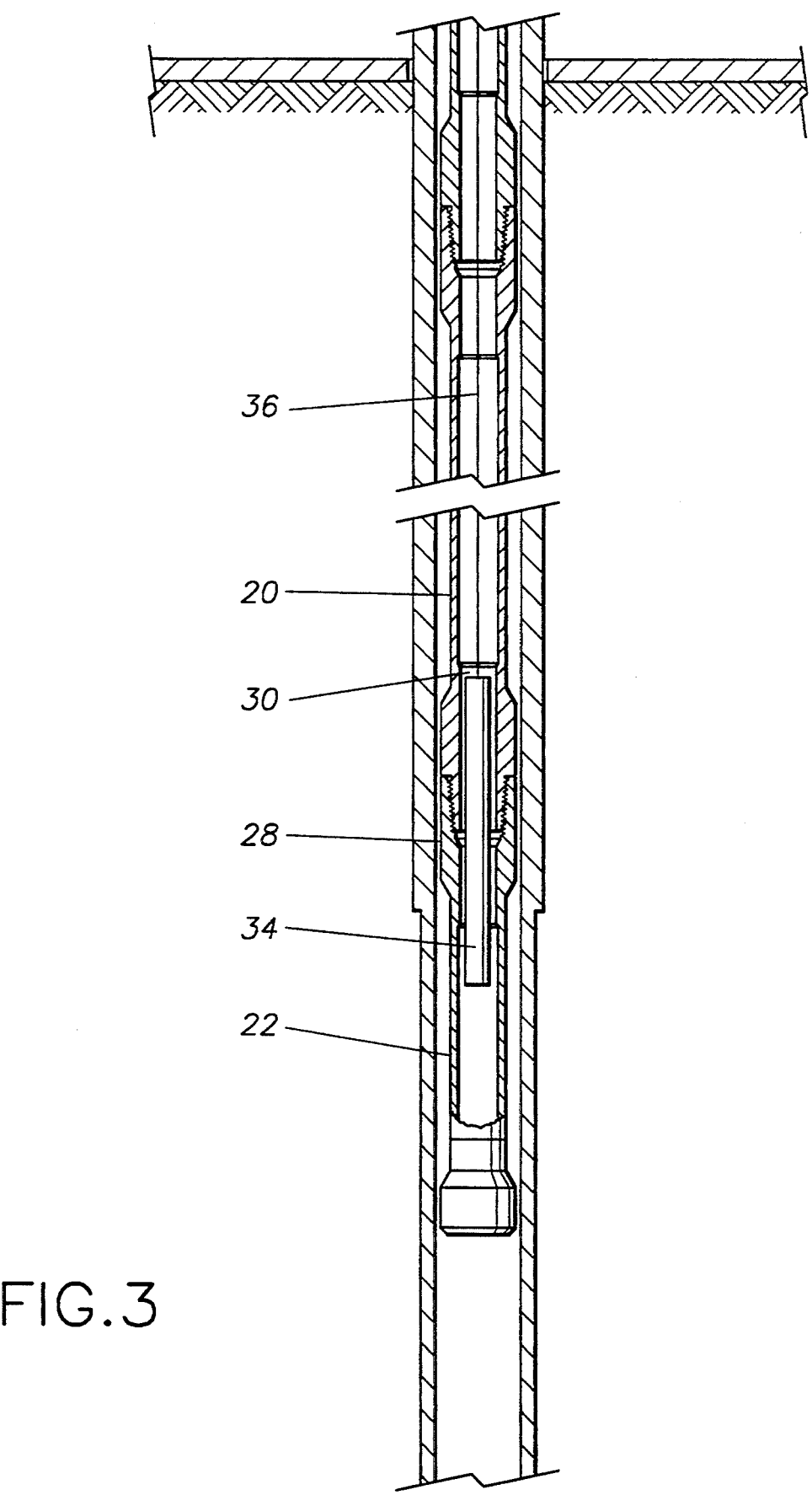
FIG. 3 illustrates a core barrel located within the tool joint.

In operation, first pipe section 20 is connected to second pipe section 22 to create pipe joint 28. As illustrated, bore 30 of pipe joint 28 has an interior diameter less than the interior diameters of first pipe section 20 and second pipe section 22. First pipe section 20 and second pipe section 22 are placed into the wellbore, fluid (not shown) is placed therein, and a tool such as core barrel 34 is transported therethrough. As core barrel encapsulates a core sample and is withdrawn with wireline 36, core barrel 34 passes through pipe joint 28 as illustrated in FIG. 3. Because the annulus between core barrel 34 has a smaller cross-section than the annulus between core barrel 34 and first pipe section 20 or second pipe section 22, pipe joint 28 impedes the flow of fluid around core barrel 34 as core barrel 34 is transported into or out of the drill string. To minimize this impedance, fluid passage 32 provides an opening to permit the transport of the fluid around pipe joint 28. This flow reduces pressure variations in the fluid due to transport of core barrel 34. Wireline 36 can lower or raise core barrel 34 within the drill string. Alternatively, core barrel 34 can be transported by pumping techniques known in the art, which are particularly useful in horizontal applications.

In one embodiment of the invention, as illustrated in FIG. 2, the drill string can comprise four inch pipe sections having an internal diameter of 3.340 inches. Although the standard bore dimension through a pipe joint can be 2.438 inches, pipe joint 28 shown in FIG. 2 has been bored to an internal diameter of 3.0 inches. These dimensions are illustrative only and do not define the scope of the inventive concepts herein. These dimensions illustrate one embodiment of the invention wherein a balance between certain criteria is maintained. Specifically, such embodiment maximizes bore 30 through pipe joint 28 to permit the passage of the largest possible tools, while maintaining sufficient wall thickness in pipe joint 28 to maintain the structural integrity of pipe joint 28. It will be appreciated that the configuration, location, and number of fluid passages 32 can be modified to maintain the structural integrity of pipe joint 28 while maximizing the potential flow of fluid across pipe joint 28. This fluid flow balances the pressure of the fluid acting on opposite ends of core barrel 34 as core barrel 34 is transported through pipe joint 28.

Although the present invention has been described in terms of certain preferred embodiments, it will be apparent to those of ordinary skill in the art that various modifications can be made to the inventive concepts without departing from the scope of the invention. The embodiments shown herein are merely illustrative of the inventive concepts and should not be interpreted as limiting the scope of the inventive concepts.

What is claimed is:

1. An apparatus for permitting the passage of a core barrel through the interior of a pipe used in coring operations, comprising:

a first pipe section having an interior diameter of a selected dimension and having threaded connection ends at each end of said first pipe section, said threaded connection ends having an interior diameter less than the interior diameter of said first pipe section;

a second pipe section having an interior diameter substantially equal to the interior diameter of said first pipe section and having threaded connection ends at each end, said threaded connection ends having an interior diameter less than the interior diameter of said second pipe section and one of said second pipe threaded connection ends being connected to one of said first pipe section threaded connection ends to create a pipe joint having an interior wall of a diameter less than the interior diameters of said first and second pipe sections, said interior wall defining a pipe joint bore; and at least one groove across said interior wall of said pipe joint for permitting the transport of fluid between the interior of said first pipe section and the interior of said second pipe section when the core barrel is positioned within said pipe joint bore.

2. An apparatus as recited in claim 1, wherein said groove is substantially parallel to said first pipe section.

3. An apparatus as recited in claim 1, wherein said first and second pipe sections comprise drill pipe.

4. An apparatus as recited in claim 1, further comprising a plurality of grooves across the interior wall of said pipe joint for permitting the transport of fluid between the interior of said first pipe section and the interior of said second pipe section.

5. A method for permitting the passage of a tool through the interior of a pipe, comprising the steps of:
connecting a first pipe section connection end to a second pipe section connection end to create a pipe joint, said pipe joint joining a first pipe section and a second pipe section, said first pipe section and said second pipe section having a predetermined interior diameter, said pipe joint having an interior wall defined by a diameter less than the interior diameter of said first and second pipe sections, said interior wall defining a pipe joint bore, said pipe joint including a groove on the interior wall of said pipe joint;
installing said first and second pipe sections in a well;
placing fluid into the interior of said first and second pipe sections; and
transporting the tool through said first pipe section and then through said pipe joint bore, wherein said groove permits the transport of the fluid across said pipe joint as the tool moves through said pipe joint bore.

6. A method as recited in claim 5, further comprising the step of operating the tool to sever a core sample from the well.

7. A method as recited in claim 6, further comprising the step of transporting the tool through said pipe joint bore to move said core sample from the interior of said first pipe section to the interior of said second pipe section.

8. A method for transporting a core barrel through the interior of a drill pipe, comprising the steps of:
connecting a first pipe section connection end to a second pipe section connection end to create a pipe joint, said pipe joint joining a first drill pipe section and a second drill pipe section, said first and second drill pipe sections having a predetermined interior diameter, said pipe joint having an interior wall defined by a diameter less than the interior diameter of said first and second drill pipe sections said pipe joint interior wall defining a pipe joint bore, said pipe joint interior wall having a groove;
installing said first and second pipe sections in a well;
placing fluid into the interior of said first and second pipe sections; and
transporting the core barrel through said first pipe section and through said pipe joint bore, wherein said groove permits the passage of the fluid through said groove, as the core barrel moves through said pipe joint and displaces the fluid within said first and second drill pipe sections, to equalize the fluid pressure acting on the core barrel.

9. A method as recited in claim 8, further comprising the step of severing a core sample from the wellbore.

10. A method as recited in claim 9, further comprising the step of transporting the core sample through said pipe joint.

11. A method as recited in claim 10, further comprising the step of circulating the fluid through said pipe joint as the core sample is transported through said pipe joint.

12. A pipe assembly comprising:
a first pipe section having a first connection end formed at one end of said first pipe section, said first pipe section and said first connection end oriented about a common center line, said first pipe section having a bore defined by a first radius, said first connection end having a bore defined by a radius less than said first radius; and
a first fluid passage extending across said first connection end, said first fluid passage being disposed from said centerline at a distance greater than the radius of said connection end bore.

13. A pipe assembly as described in claim 12, further comprising:
a second pipe section having a second connection end formed at one end, said second pipe section and said second connection end oriented about said common centerline, said second pipe section having a bore defined by a second radius, said second connection end having a bore defined by a radius less than said second radius; and
a second fluid passage extending across said second connection end, said second fluid passage being disposed from said centerline at a distance greater than the radius of said second connection end bore, said first connection end engaging said second connection end to form a pipe joint, said first fluid passage being in fluid communication with said second fluid passage.

14. A pipe assembly as recited in claim 13, wherein said first and second connection ends are in threaded engagement.

15. A pipe assembly as recited in claim 13, wherein said first and second pipe sections comprise drill pipe.

16. A pipe assembly as recited in claim 13, wherein said pipe joint has an interior wall, and wherein said first and second fluid passages are grooves in said interior wall.

17. A pipe assembly as recited in claim 13, wherein said fluid passages comprise a port through said pipe joint permitting fluid communication between said first and second pipe sections.

18. A pipe assembly comprising:
a first pipe section joined to a second pipe section at a joint, said first and second pipes sections and said joint oriented about a common centerline, said first pipe section having a bore defined by a predetermined first radius, said second pipe section having a bore defined by a second predetermined radius, said joint having a bore defined by a radius less than the radii of said first and said second pipe section bores; and
a fluid passage across said joint permitting fluid communication between said first pipe section and said second pipe section, said fluid passage being disposed from said common centerline at a distance greater than the radius of said joint bore.

* * * * *

UNITED STATES PATENT AND TRADEMARK OFFICE
CERTIFICATE OF CORRECTION

PATENT NO.   : 5,425,428

DATED        : June 20, 1995

INVENTOR(S)  : John C. Chatagnier, Jr. and Delbert L. Head

It is certified that error appears in the above-identified patent and that said Letters Patent is hereby corrected as shown below:

Column 4, line 21, change "2,438" to --2.438--.

Signed and Sealed this

Twenty-eighth Day of November 1995

Attest:

BRUCE LEHMAN

Attesting Officer     Commissioner of Patents and Trademarks